(12) United States Patent
Myler et al.

(10) Patent No.: US 6,577,764 B2
(45) Date of Patent: Jun. 10, 2003

(54) METHOD FOR MEASURING AND ANALYZING DIGITAL VIDEO QUALITY

(75) Inventors: Harley R. Myler, Orlando, FL (US); Michele Van Dyke-Lewis, Orlando, FL (US)

(73) Assignee: Teranex, Inc., Orlando, FL (US)

(*) Notice: Subject to any disclaimer, the term of this patent is extended or adjusted under 35 U.S.C. 154(b) by 2 days.

(21) Appl. No.: 09/918,824

(22) Filed: Aug. 1, 2001

(65) Prior Publication Data

US 2003/0031368 A1 Feb. 13, 2003

(51) Int. Cl.$^7$ ................................................. G06K 9/74
(52) U.S. Cl. .................. 382/228; 382/305; 375/240.27; 348/180
(58) Field of Search ............................... 382/228, 103, 382/110, 107, 117, 128, 119, 132, 118, 151, 153, 155, 156, 162, 165, 167, 190, 195, 201, 206, 209, 216–218, 219, 232–233, 255, 236, 276, 294, 309, 305, 323, 240, 124–125, 160, 260–265; 348/192, 180, 448, 189, 179; 375/240.27, 240.01, 240.02, 240.17; 358/518; 324/76.22; 600/544

(56) References Cited

U.S. PATENT DOCUMENTS

| | | | | |
|---|---|---|---|---|
| 4,623,837 A | | 11/1986 | Efron et al. | 324/76.22 |
| 5,109,425 A | * | 4/1992 | Lawton | 382/107 |
| 5,206,918 A | * | 4/1993 | Levene | 382/110 |
| 5,291,560 A | * | 3/1994 | Daugman | 382/117 |
| 5,446,492 A | | 8/1995 | Wolf et al. | 348/192 |
| 5,574,500 A | | 11/1996 | Hamada et al. | 348/180 |
| 5,596,364 A | | 1/1997 | Wolf et al. | 348/192 |
| 5,699,121 A | * | 12/1997 | Zakhor et al. | 375/240.17 |
| 5,790,717 A | | 8/1998 | Judd | 382/323 |
| 5,818,520 A | | 10/1998 | Janko et al. | 348/192 |
| 5,835,627 A | | 11/1998 | Higgins et al. | 382/167 |
| 5,926,555 A | * | 7/1999 | Ort et al. | 382/124 |
| 5,929,918 A | | 7/1999 | Marques Pereira et al. | 348/448 |
| 5,940,124 A | | 8/1999 | Janko et al. | 348/189 |
| 6,070,098 A | * | 5/2000 | Moore-Ede et al. | 600/544 |
| 6,075,884 A | | 6/2000 | Lubin et al. | 382/156 |

OTHER PUBLICATIONS

Xiong et al., Gabor filters and their use in focus and correspondence, 1994, IEEE, 1063–6919/94, 668–671.*

Lambrecht et al. (Quality Assessment of Motion Rendition in Video Coding, IEEE 1051–8215/99, pp. 766–782.*

Wolf, S., "Features for Automated Quality Assessment of Digitally Transmitted Video", NTIA Report 90–264, U.S. Dept. of Commerce, Jun. 1990.

Wolf, S. and Pinson, M.H., "Spatial Temporal Distortion Metrics For In–Service Quality Monitoring of Any Digital Video System", SPIE International Symposium on Voice, Video and Data Communications, Boston, MA, Sep. 11–22, 1999.

(List continued on next page.)

Primary Examiner—Phuoc Tran
Assistant Examiner—Ishrat Sherali
(74) Attorney, Agent, or Firm—Piper Rudnick LLP; Steven B. Kelber

(57) ABSTRACT

A method and system for analyzing and measuring image quality between two images. A series of conversions and transformations of image information are preformed to produce a single measure of quality. A YCrCb frame sequence is first converted using RGB conversion to an RGB frame sequence. The resulting RGB frame sequence is converted using spherical coordinate transform (SCT) conversion to SCT images. A Gabor filter is applied to the SCT images to produce a Gabor Feature Set, and a statistics calculation is applied to the Gabor Feature Set. The resulting Gabor Feature Set statistics are produced for both the reference frame and the frame to be compared. Quality is computed for these Gabor Feature Set statistics to produce a video quality measure. Spectral decomposition of the frames is also performable for the Gabor Feature Set, rather than the statistics calculation, allowing graphical comparison of results for the compared frames.

16 Claims, 10 Drawing Sheets

OTHER PUBLICATIONS

"Final Report From the Video Quality Experts Group on the Validation of Objective Models of Video Quality Assessment", Rohaly, A., Libert, J., Corriveau, P. and Webster, A., eds., Mar. 2000, unpublished public domain document.

Hyams, J., Powell, M. and Murphy, R., "Cooperative Navigation of Micro–Rovers Using Color Segmentation", Autonomous Robots, pp. 7–16, Aug. 2000.

Umbaugh, S.E., "Computer Vision and Image Processing", Prentice–Hall, NJ. 1998, pp. 26–28, 85–88, 413, 433, 459, 464, 468, 474, 480, 484.

Jones, J. and Palmer, L, "An Evaluation of The Two–Dimensional Gabor Filter Model of Simple Receptive Fields in Car Striate Cortex", J. Neurophysial, 58:6, pp. 1233–1258, 1987.

Daugman, J.D., "Complete Discrete 2–D Gabor Transforms by Neural Networks for Image Analysis and Compression", IEEE Trans. On Acoustics, Speech, and Signal Processing, 36:7, pp. 1169–1179, 1988.

Barrett, H., Yao, J., Rolland, J. and Myers, K., "Model Observers for Assessment of Image Quality", Proc. Natl. Acad. Sci., 90, pp. 9758–9765, 1993.

Lubin, J., "The Use of Psychophysical Data and Models in theAnalysis of Display System Performance", Digital Images and Human Vision, Watson, A.B., ed., MIT Press, Cambridge, pp. 163–178, 1993.

Jackson, W., Said, M., Jared, D., Larimer, J., Gille, J., Lubin, J., "Evaluation of Human Vision Models for Predicting Human–Observer Performance", Proc. SPIE vol. 3636, Medical Imaging, 1997.

Powell, M and Murphy, R., "Position Estimation of Micro–Rovers Using a Spherical Coordinate Transform Color Segmenter", Dept. of Computer Science and Engineering, University of South Florida, (undated).

* cited by examiner

FIG. 1A
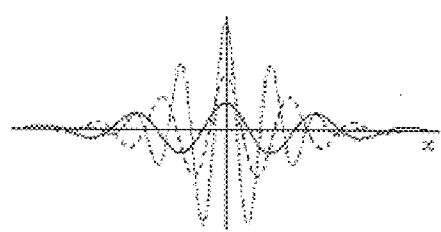
FIG. 1B
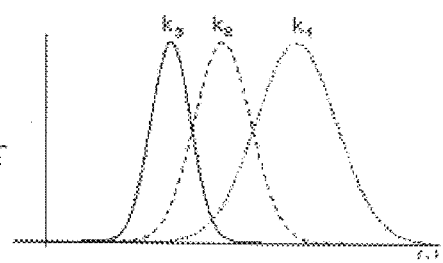
FIG. 1C
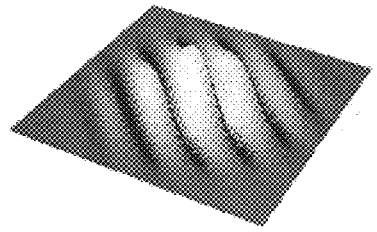
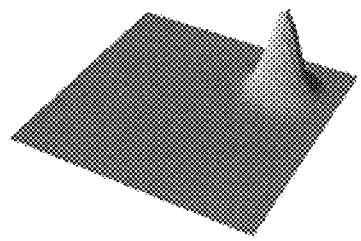
FIG. 1D

| Assigned number | Sequence | Characteristics | Source |
|---|---|---|---|
| 13 | Baloon-pops | film, saturated color, movement | FILM |
| 14 | NewYork | masking effect, movement | AT&T |
| 15 | Mobile&Calendar | available in both formats, color, movement | CCETT |
| 16 | Betes_pas_betes | color, synthetic, movement, scene cut | Not Listed |

FIG. 3

| S-SRC 13 | GDA-SRC 13 | S-SRC 14 | GDA-SRC 14 | S-SRC 15 | GDA-SRC 15 | S-SRC 16 | GDA-SRC 16 |
|---|---|---|---|---|---|---|---|
| 3 | 4 | 2 | 1 | 7 | 3 | 2 | 7 |
| 2 | 2 | 7 | 10 | 2 | 2 | 3 | 3 |
| 7 | 3 | 10 | 5 | 10 | 7 | 5 | 2 |
| 6 | 7 | 4 | 3 | 12 | 12 | 7 | 10 |
| 5 | 6 | 5 | 2 | 5 | 9 | 4 | 9 |
| 4 | 8 | 9 | 9 | 3 | 5 | 6 | 5 |
| 1 | 5 | 3 | 7 | 4 | 10 | 9 | 12 |
| 8 | 1 | 6 | 4 | 9 | 11 | 8 | 11 |
| 10 | 12 | 12 | 12 | 11 | 6 | 12 | 13 |
| 12 | 13 | 11 | 11 | 8 | 4 | 14 | 6 |
| 9 | 9 | 8 | 16 | 14 | 8 | 13 | 8 |
| 13 | 10 | 14 | 15 | 6 | 13 | 11 | 14 |
| 16 | 14 | 1 | 6 | 1 | 14 | 10 | 4 |
| 11 | 11 | 13 | 8 | 16 | 1 | 16 | 16 |
| 14 | 16 | 16 | 13 | 15 | 16 | 15 | 15 |
| 15 | 15 | 15 | 14 | 13 | 15 | 1 | 1 |
| Correlation: | 0.821 | | 0.721 | | 0.103 | | 0.674 |
| PSNR: | 0.324 | | | | -0.226 | | |

FIG. 4A

| R-SRC 13 | p0 | p1 | p2 | p3 | p4 | p5 | p6 | p7 | p8 | p9 |
|---|---|---|---|---|---|---|---|---|---|---|
| 3 | 13 | 2 | 2 | 3 | 15 | 3 | 8 | 3 | 2 | 2 |
| 2 | 9 | 6 | 6 | 2 | 16 | 2 | 5 | 2 | 3 | 4 |
| 7 | 10 | 7 | 4 | 12 | 1 | 4 | 2 | 6 | 7 | 3 |
| 6 | 6 | 4 | 7 | 6 | 14 | 6 | 3 | 4 | 6 | 6 |
| 5 | 1 | 3 | 1 | 4 | 11 | 7 | 4 | 7 | 4 | 1 |
| 4 | 2 | 1 | 8 | 10 | 9 | 8 | 6 | 8 | 8 | 7 |
| 1 | 3 | 10 | 10 | 8 | 4 | 10 | 12 | 10 | 10 | 8 |
| 8 | 15 | 8 | 5 | 1 | 5 | 1 | 10 | 1 | 5 | 5 |
| 10 | 5 | 5 | 3 | 7 | 12 | 5 | 7 | 5 | 1 | 10 |
| 12 | 11 | 12 | 12 | 11 | 8 | 12 | 14 | 13 | 13 | 9 |
| 9 | 7 | 9 | 13 | 13 | 10 | 13 | 9 | 9 | 9 | 13 |
| 13 | 8 | 13 | 9 | 9 | 13 | 9 | 1 | 14 | 12 | 12 |
| 16 | 4 | 16 | 14 | 5 | 6 | 11 | 16 | 16 | 14 | 14 |
| 11 | 16 | 11 | 11 | 14 | 7 | 14 | 13 | 15 | 11 | 11 |
| 14 | 12 | 14 | 16 | 16 | 2 | 16 | 11 | 12 | 16 | 16 |
| 15 | 14 | 15 | 15 | 15 | 3 | 15 | 15 | 11 | 15 | 15 |
| Corr: | 0.324 | 0.794 | 0.650 | 0.506 | -0.388 | 0.626 | 0.459 | 0.679 | 0.706 | 0.797 |
| R-SRC 15 | p0 | p1 | p2 | p3 | p4 | p5 | p6 | p7 | p8 | p9 |
| 7 | 14 | 2 | 2 | 3 | 1 | 2 | 8 | 3 | 2 | 2 |
| 2 | 10 | 7 | 7 | 2 | 15 | 3 | 10 | 2 | 7 | 3 |
| 10 | 1 | 12 | 12 | 12 | 16 | 7 | 14 | 7 | 3 | 7 |
| 12 | 11 | 10 | 10 | 10 | 13 | 12 | 15 | 10 | 10 | 4 |
| 5 | 13 | 3 | 4 | 11 | 14 | 4 | 1 | 5 | 4 | 12 |
| 3 | 9 | 5 | 5 | 7 | 4 | 10 | 16 | 4 | 5 | 6 |
| 4 | 8 | 9 | 11 | 9 | 8 | 6 | 9 | 6 | 12 | 5 |
| 9 | 15 | 11 | 9 | 4 | 6 | 5 | 11 | 9 | 6 | 8 |
| 11 | 3 | 4 | 6 | 5 | 5 | 9 | 2 | 8 | 9 | 11 |
| 8 | 16 | 6 | 3 | 6 | 11 | 8 | 3 | 11 | 8 | 1 |
| 14 | 12 | 14 | 8 | 8 | 9 | 11 | 13 | 14 | 11 | 10 |
| 6 | 5 | 8 | 14 | 14 | 12 | 14 | 12 | 13 | 14 | 9 |
| 1 | 6 | 13 | 1 | 13 | 10 | 1 | 4 | 16 | 1 | 14 |
| 16 | 4 | 16 | 13 | 16 | 7 | 13 | 6 | 12 | 13 | 16 |
| 15 | 7 | 1 | 16 | 1 | 2 | 16 | 7 | 1 | 16 | 13 |
| 13 | 2 | 15 | 15 | 15 | 3 | 15 | 5 | 15 | 15 | 15 |
| Corr: | -0.226 | 0.271 | 0.594 | 0.103 | -0.303 | 0.712 | -0.006 | 0.203 | 0.600 | 0.397 |

FIG. 4B

METHOD FOR MEASURING AND ANALYZING DIGITAL VIDEO QUALITY

BACKGROUND OF THE INVENTION

1. Field of the Invention

The field of the invention relates to real time video processing, and, more specifically, to measurement of digital video image quality using principles of human physiological perception.

2. Background of the Technology

The future of image transmission—indeed, much of the present—is the streaming of digital data over high-speed channels. Streaming audio and video and other forms of multimedia technologies are becoming increasingly common on the Internet and in digital broadcast satellite television, and will take over most of the television broadcast industry in the next decade.

Broadcasters naturally want to build quality assurance into the product they send their customers. Such quality assurance is difficult, especially when video streams originate in a variety of different formats. Furthermore, various transmission channels have quite different degradation characteristics. Experts in video quality analysis and standardization communities have been and currently are grappling with this problem by assessing various methods of digital video quality assessment and correction in order to standardize quality measurement.

These considerations drive the search for the most objective mathematical and computational techniques to enable quality metrics. Ultimately, to be of any use, calculated quality measurements and the quality humans perceive during viewing must correlate. Mathematically modeling the visual pathways and perceptual processes inside the human body is a natural way to maximize this correlation.

Previous methods to computationally model the way humans judge visual quality relied on the lowest perceptual mechanisms, principally at the retinal level. A good example of these methods is edge detection, a visual function that takes place in the retina. There is an unmet need for visual quality measurement methods that model the higher functions of the human visual pathway in the visual cortex, the level at which the brain understands what is seen.

Specifically, a number of problems with the prior art exist in the regime of video quality analysis or measurement and the fundamental technique of video quality analysis with regard to digital video. One example in terms of digital video is what viewers often receive from a dish network, such as provided by Echostar Satellite of Littleton, Colo., or DirecTV® of El Segundo, Calif. Digital video is also what viewers typically see when working with a computer to, for example, view Internet streaming and other video over the Internet. Other examples of digital video include Quicktime™ movies, supported by Apple Computer, Inc., of Cupertino, Calif., AVI movies in Windows, and video played by a Windows media player. Another important example of digital video is high definition television (HDTV). HDTV requires a substantially greater amount of bandwidth than analog television due to the high data volume of the image stream.

What viewers currently watch, in general, on standard home television sets is analog video. Even though the broadcast may be received as digital video, broadcasts are typically converted to analog for presentation on the television set. In the future, as HDTV becomes more widespread, viewers will view digital video on home televisions. Many viewers also currently view video on computers in a digital format.

An unmet need exists in the prior art for a fundamental method of analyzing video quality. The need arises typically to address some type of degradation in the video. For example, noise may have been introduced in a video stream that causes the original picture to be disturbed. There are various types of noises, and the particular type of noise can be critical. For example, one form of digital video quality measurement involves examination of the specific type of degradation encountered.

Examples of various types of noise include the following. In one type of digital noise, the viewer sees "halos" around the heads of images of people. This type of noise is referred to as "mosquito noise." Another type of noise is a motion compensation noise that often appears, for example, around the lips of images of people. With this type of noise, to the viewer, the lips appear to "quiver." This "quivering" noise is noticeable even on current analog televisions when viewing HDTV broadcasts that have been converted to analog.

The analog conversion of such broadcasts, as well as the general transmittal of data for digital broadcasts for digital viewing, produces output that is greatly reduced in size from the original HDTV digital broadcast, in terms of the amount of data transferred. Typically, this reduction in data occurs as a result of compression of the data, such as occurs with a process called moving pictures expert group (MPEG) conversion or otherwise via lossy data compression schemes known in the art. The compression process selectively transfers data, reducing the transmittal of information among frames containing similar images, and thus greatly improving transmission speed. Generally, the data in common among these frames is transferred once, and the repetitive data for subsequent similar frames is not transferred again. Meanwhile, the changing data in the frames continues to be transmitted. Some of the noise results from the recombination of the continually transferred changing data and reused repetitive data.

For example, when a news broadcaster is speaking, the broadcaster's body may not move, but the lips and face may continuously change. The portions of the broadcaster's body, as well as the background behind the broadcaster on the set, which are not changing from frame to frame, are only transmitted once as a result of the compression routine. The continuously changing facial information is constantly transmitted. Because the facial information represents only a small portion of the screen being viewed, the amount of information transmitted from frame to frame is much smaller than would be required for transmission of the entire frame for each image. As a result, among other advantages, the transmission rate for such broadcasts is greatly increased from less use of bandwidth.

As can be seen from the above example, one type of the changing data that MPEG continuously identifies for transfer is data for motion occurring among frames, an important part of the transferred video. For video quality purposes, accurate detection of motion is important. Inaccuracies in identification of such motion, however, lead to subjective image quality degradation, such as lip "quivering" seen in such broadcasts.

There remains an unmet need to determine, using an objective technique, the quality of video streams in a manner that is consistent with human subjective opinion of video quality. There is a further unmet need to improve on the existing state of the art for making such objective assessments, in that none of the existing techniques has proven to be superior to analysis using peak signal-to-noise ratio (PSNR).

PSNR is a mathematical comparison of differences among video frames, once the frames have been reduced to numerical data, following capture and processing in a computer. For example, video that is operated upon, such as by undergoing transmission to a remote site for viewing, typically can undergo degradation in video quality. Such operations upon the video stream are generically referred to as "hypothetical reference circuits" (HRCs). Comparison may be made in this example between the original source video stream and the transmitted, possibly degraded video stream in order to determine the amount of degradation that has occurred.

In one existing method for subjectively measuring such possible degradation, the original frames or video sequences are shown to human observers, and then the possibly degraded frames or sequences are shown to the observers. The observers are then asked to rank the degradation on a scale, such as a scale of one to ten.

In one simple existing objective technique of video quality analysis, the numerical data that is produced by inputting each original frame is compared to the numerical data for each possibly degraded frame. The difference is determined between the numerical data in the frames on a pixel by pixel basis between the original and possibly degraded frame, and the differences are then squared, summed, and normalized. The resulting value produced by this method is referred to as PSNR.

It has been found that some correlation exists between PSNR and human subjective analysis. However, although there has been some correlation, this correlation has not been found to be sufficiently robust for PSNR to be determined to be fully equivalent to subjective analysis. Further, in some cases, PSNR indicates that video quality is good, when subjective measures find the quality to be poor.

One drawback of PSNR is that this method does not account for aspects of human visual perception other than gross numeric comparison. This is one reason why PSNR is sometimes inaccurate. There remains an unmet need to address video quality using biomimetic principles, those principles that mimic biological behaviors. In particular, there is a need to focus on biomimetic principles based on the human visual system.

Other techniques have been developed to attempt to provide objective measures that mimic human perceptions. One known technique, described in U.S. Pat. Nos. 5,446,492 and 5,596,364 to Wolf et al. involves edge detection. Edges of images have long been recognized as a part of the human perception of images. Importance of edges is well known within the literature, in human psycho-visual-analysis and, for example, in machine vision. In a broad sense, the method of the patents to Wolf et al. involves detecting the edge of the frame, then performing a PSNR type of analysis between the edges. This approach has been found to be statistically equivalent to PSNR.

U.S. Pat. No. 6,075,884 to Lubin et al. involves a technique known as "just noticeable difference". The method of the patent to Lubin et al. attempts to localize the variations between pixels in the reference and the analysis frame. Generally, rather than determining arithmetic differences among frames globally, the method of Lubin et al. attempts to identify small variations between the frames which are counted. The total of these small variations, which are counted, produce a result called Just Noticeable Difference (JND). More specifically, the patent includes three types of measurements: 1) a luma measurement; 2) a chroma measurement; and 3) and a combined measurement of these two maps, referred to as a "JND map." The JND measurements, or maps, are produced by processing four levels in the luma, seven levels in the chroma, application of a gaussian filter, and then decimation by two for each level. The JND measurements are performed on the source video and the video to be compared, and then the differences are determined between the results for the two resulting maps. This method also involves the use of a front-end processing engine. The method of this patent has not been found to produce a significantly different result from PSNR.

Another example of the prior art is a method produced by KDD Media Will Corp. of Japan. The KDD method generally involves analysis of regions and determination of specific differences between regions for the source and compared frames. The method also includes some edge analysis. This method has the theoretical advantage that it mimics human focus on specific items or objections, which correspond to regions of the image.

U.S. Pat. No. 5,818,520 to Bozidar Janko et al., describes a method of automatic measurement of compressed video quality that superimposes special markings in the active video region of a subset of contiguous frames within a test video sequence. The special markings provide a temporal reference, a spatial reference, a gain/level reference, a measurement code, a test sequence identifier, and/or a prior measurement value. The temporal reference is used by a programmable instrument to extract a processed frame from the test video sequence after compression encoding-decoding, which is temporally aligned with a reference frame from the test video sequence. Using the spatial reference, the programmable instrument spatially aligns the processed frame to the reference frame. The programmable instrument uses the measurement code to select the appropriate measurement protocol from among a plurality of measurement protocols. In this way video quality measures for a compression encoding-decoding system are determined automatically as a function of the special markings within the test video sequence.

U.S. Pat. No. 4,623,837 to Edward Efron et al., describes a method and means for evaluating the quality of audio and/or video transfer characteristics of a device upon which, or through which, audio and/or video information is contained, or passes, respectively. Both the method and apparatus of this patent concern the evaluation of the quality of information transfer in the recording and playing back of a recording medium or in the transferring of audio and/or video information through an information handling device, referred to as a throughput device. Unit evaluation is accomplished by establishing an input signal of known content, measuring selected parameters of selected parts of the input signal, feeding the input signal to the unit under test, measuring the parameters of parts of the output signal from the unit under test corresponding to the same selected parts of the input signal, and comparing the selected parameters of the input signal with the corresponding parameters of the output signal. Whether monitoring the quality of the signal transfer characteristics of a throughput device, a magnetic tape containing program material, or a video disc, master disc, or replica, a "signature" is created for the unit under test, and subsequent analysis of the unit as it progresses along a production line or of a copy made on the same or alternate recording medium results in a second "signature," which is compared against the first signature to make a determination as to the quality of the signal handling or transfer characteristics of the unit. In this manner, out-of-tolerance conditions can be automatically detected, thereby eliminating subjectivity and providing consistency in the quality level of device testing.

U.S. Pat. No. 5,574,500 to Takahiro Hamada et al., describes a sync controller that controls an amount of delay of a delay part so that original video data entered from a video source is synchronized with reproduced video data, which is compressed and reproduced by a system to be evaluated. A first orthogonal transformation (OT) calculator orthogonally transforms a reproduced image, a second OT calculator orthogonally transforms an original image, and a subtractor obtains a difference value of the same order coefficients in one block. A weighted signal to noise ratio (WSNR) calculator weights the difference with a weighting function which varies with a position of a coefficient of orthogonally transformed data and a magnitude of an alternating current (AC) power in the block after orthogonal transform of the original image and subsequently obtains an average weighted signal to noise (S/N) ratio of each video frame or a plurality of video frames. Finally, a subjective evaluation value calculator calculates a subjective evaluation value (deterioration percentage) according to the average weighted S/N ratio. Consequently, the invention provides video quality evaluating equipment for a reproduced image of a video signal subject to digital compression capable of economically evaluating video quality in a short period of time.

U.S. Pat. No. 5,940,124 to Bozidar Janko et al., describes attentional maps that reflect the subjective view of an observer to the effects of degradation in a video image that are used in the objective measurement of video quality degradation. The observer assists in generating an attentional map for each image of a test image sequence, which provides different thresholds or weighting factors for different areas of each image. A video image sequence from a system under test is compared with the test image sequence, and the error results are displayed as a function of the corresponding attentional maps.

U.S. Pat. No. 5,929,918 to Ricardo Alberto Marques Pereira et al., describes an interpolation filter for video signals that includes four circuits to improve video quality in both intra-field and inter-field modes. The interpolation filter is configured to interpolate according to the direction of an image edge. The interpolation filter is also configured to interpolate in a prescribed spatial direction when no image edges can be univocally determined. The first circuit detects an image edge of discrete image elements to generate a first signal. The second circuit uses output from the first circuit to generate a first signal corresponding to an average of the discrete image elements along a direction of the image edge. The third circuit uses output from the first circuit to detect a texture image area wherein an image edge cannot be univocally determined and for generating a second signal depending on a degree of existence of the image edge. The fourth circuit is supplied by the first signal, the second signal, and a third signal. The fourth circuit generates an output signal obtained by combining the first signal with the third signal in a proportion dependent upon the second signal. Additionally, the fourth circuit is configured for multiplexing to selectively couple the third signal to a fourth signal, corresponding to an average of the discrete image elements along a prescribed direction, or to a fifth signal corresponding to a previously received image element value.

U.S. Pat. No. 5,790,717 to Thomas Helm Judd describes an apparatus and method for predicting a subjective quality rating associated with a reference image compressed at a given level. The invention includes components and steps for storing a digitized color image representing a reference image in memory and compressing at a given level and decompressing the reference image to produce a processed image. The invention also entails converting the reference image and the processed image each to a grayscale image and dividing each grayscale image into an array of blocks. The invention further includes generating a first intensity variance array corresponding to the array of blocks of the grayscale reference image and a second intensity variance array corresponding to the array of blocks of the grayscale processed image. Lastly, the invention involves generating a variance ratio based on the first and second intensity variance arrays, determining a block variance loss based on the variance ratio, and generating the subjective quality rating indicated by the impairment level based on the variance loss.

U.S. Pat. No. 5,835,627 to Eric W. Higgens et al., describes an image processing system and method for processing an input image that provides a virtual observer for automatically selecting, ordering, and implementing a sequence of image processing operations, which will yield maximum customer satisfaction as measured by a customer satisfaction index (CSI), which, for example, can balance the image quality and the processing time. The CSI evaluates an effect of the sequence of image processing operations on the input image in response to upstream device characteristic data received from an input device profile, downstream device characteristic data received from an output device profile, host configuration data, user selection data, trial parameter values, and data corresponding to the sequence of image processing operations. In a preferred embodiment, the effect is evaluated in accordance with predetermined psychovisual attributes of the input image, as attained and codified by human observers who have subjectively selected a most pleasing test image corresponding to objective metrics of the predetermined psychovisual attributes.

Other existing methods include identifying specific degradations, such as blocking effects of the discrete cosine transform (DCT) or mosquito noise for format conversions, and correcting for these specifically identified degradation.

There thus remains a number of unsolved problems with these existing methods. For example, none of these existing methods uses a Gabor filter as a basis for measuring quality. A second problem is that none uses a spherical coordinate transform (SCT), a process shown to enhance objective results when compared to subjective analyses of image quality. A third problem is that none mimics human visual functions at the visual cortex level, an approach capable of producing higher likelihood of correlation with subjective analyses.

SUMMARY OF THE INVENTION

One advantage of the present invention is that it does not require reference source data to be transmitted along with the video data stream. Another advantage of the present invention is that it is suitable for online, real-time monitoring of digital video quality. Yet another advantage of the present invention is that it detects many artifacts in a single image, and is not confined to a single type of error.

In order for objective computations of digital video quality to correlate as closely as possible with the subjective human perception of quality, embodiments of the present invention mimic the highest perceptual mechanism in the human body as the model for the measure of quality. Embodiments of the present invention therefore provide methods to measure digital video quality objectively using biomimetic principles—those principles that mimic biological behaviors.

A meaningful digital video quality measurement must match the quality perceived by human observers. Embodiments of the present invention provide methods for correlating objective measurements with the subjective results of human perceptual judgments.

The present invention includes a method and system for analyzing and measuring image quality between two images. A series of conversions and transformations of image information are performed to produce a single measure of quality. A YCrCb frame sequence (YCrCb is component digital nomenclature for video, in which the Y component is luma and CrCb (red and blue chroma) refers to color content of the image) is first converted using RGB (red, green, blue) conversion to an RGB frame sequence. The resulting RGB frame sequence is converted using spherical coordinate transform (SCT) conversion to SCT images. A Gabor filter is applied to the SCT images to produce a Gabor Feature Set, and a statistics calculation is applied to the Gabor Feature Set. The resulting Gabor Feature Set statistics are produced for both the reference frame and the frame to be compared. Quality is computed for these Gabor Feature Set statistics to produce a video quality measure. Spectral decomposition of the frames is also performable for the Gabor Feature Set, rather than the statistics calculation, allowing graphical comparison of results for the compared frames.

The YCrCb to RGB conversion is made because the eye appears to operate as an RGB device. The conversion to SCT images is made to simulate the functions performed in the visual cortex of the brain; performing operations using SCT transforms more closely matches the results of behavior of the human brain than working in other formats. The SCT conversion is made because studies have shown that the visual system of the brain tracks objects in a spherical coordinate system, as opposed to using a Cartesian coordinate system.

Further, the brain appears to perform the equivalent of a Gabor transform on images prior to the brain analyzing the visual content of the frame. The result of the application of the Gabor transform is essentially a reduced set of data, produced by filtering the original image data, that comprises the extracted features of the image. The extracted features have been shown to correspond to features that are initially extracted at the visual cortex of the brain.

Comparison of quality computations using Gabor feature set statistics have indicated that the method and system of the present invention provide results for comparing digital quality that are as effective as PSNR.

Another advantage of the present invention is that the invention's use of algorithms that model the biological processing at the visual cortex level, including the SCT and Gabor filters, provides the secondary benefit that the transform and filtering lends itself to real-time processing using a Single Instruction Multiple Data (SIMD) architecture.

Additional advantages and novel features of the invention will be set forth in part in the description that follows, and in part will become more apparent to those skilled in the art upon examination of the following or upon learning by practice of the invention.

BRIEF DESCRIPTION OF THE FIGURES

In the drawings:

FIGS. 1A–1D illustrate the shapes of filters (a Gaussian envelope restricting a plane wave) used in accordance with embodiments of the present invention;

FIG. 3 shows a table of image data used in example applications for embodiments of the present invention;

FIG. 4A provides data for compared subjective results and results for a method in accordance with embodiments of the present invention for the image data of FIG. 3;

FIG. 4B presents the complete proponents data for SRCs 13 and 15 for comparison for the image data of FIG. 3;

DETAILED DESCRIPTION

Figure 2A:
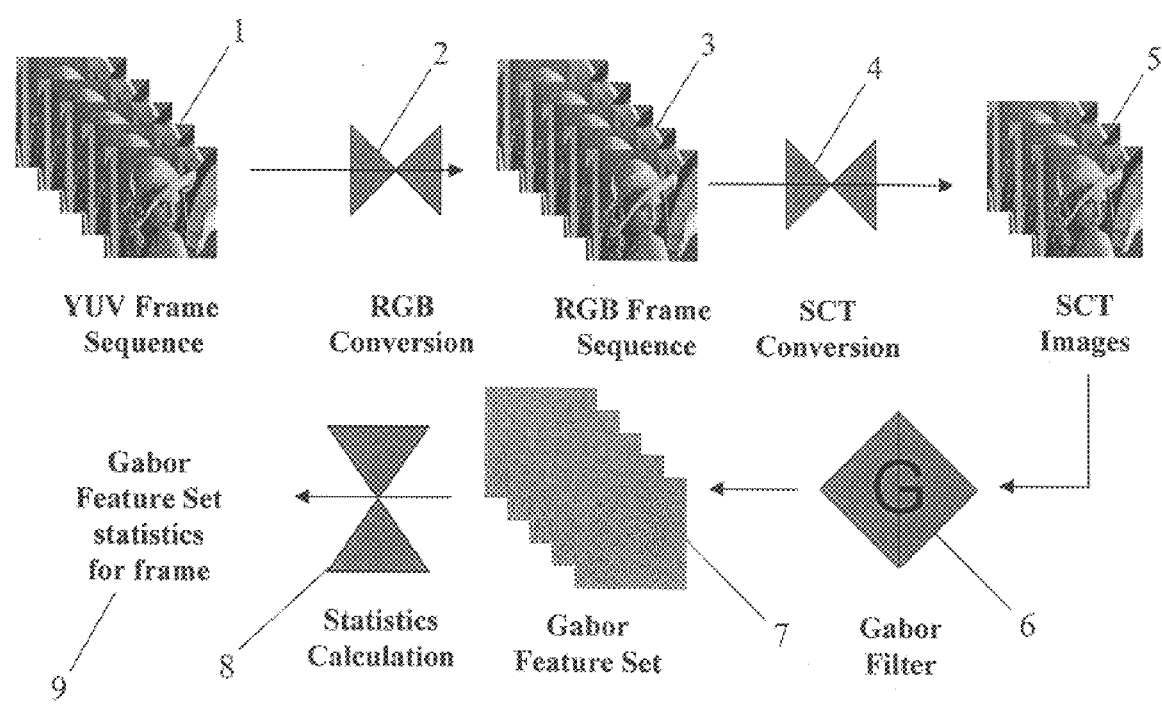
FIGS. 2A–2B presents a pictogram of a method of conversion and transformation of image information in accordance with embodiments of the present invention.

The present invention includes a method and system for analyzing and measuring digital video quality. In general, in embodiments of the present invention, a series of computational events occur, which culminate in one embodiment in a single measure of quality based on the higher levels of human perception. The result is accomplished via a series of transformations that reveal degradations in a video test image (or frame) sequence compared, for example, to a video reference image sequence. In one embodiment, a spectral decomposition in produced, rather than a single measure of quality.

The present invention uses biomimetic principles—those principles that mimic biological behaviors—including visual perception at the visual cortex level, which the human brain uses, to analyze images. Various studies have shown that the visual cortex performs specific processing on imagery received from the eye. The present invention mimics these processes in performing objective analysis of video quality.

Each of the aspects of the process of the present invention will now be discussed in more detail. The YCrCb format, which is a typical initial format for images, was developed as a color compression scheme and takes advantage of the restrictions of human eye sensitivity to color. The RGB color space, which is another format for images, covers more colors than the eye can see, and YCrCb encoding takes advantage of this characteristic. Further, YCrCb encoding can provide similar quality (to RGB) in a color image representation using 16 bits per pixel, as compared to 24 bits per pixel using RGB. The YCrCb encoding, for example, may assume 4:2:2 subsampling. Thus, a 2×2 block of pixels has the luminance represented by 4 bytes for Y, but only 2 bytes for the color difference components (U,V). The U is the color difference value Cr (Y–red) and the V is the difference value Cb (Y–blue). The reality is that human vision is an RGB process, since the color sensors in the eyes are red, green, and blue. Thus, to mimic human behaviors and to maximize advantages of the formats, for processing in accordance with methods of embodiments of the present invention, YCrCb is first converted to RGB using the standard YCrCb to RGB conversion formula.

In order to minimize processing time, a 256×256 pixel window is typically used, which is derived at the center of the frame under test, such as the fiftieth frame in the video sequence. The processing is stationary and does not account for motion effects. This is important since the resultant Gabor feature set statistics can be analyzed between two correlated frames and thus be used for other purposes, such as Reverse Frame Prediction, as described further in conjunction with applicants' U.S. patent application Ser. No. 09/911,575, filed Jul. 25, 2001, and titled "METHOD FOR MONITORING AND AUTOMATICALLY CORRECTING DIGITAL VIDEO QUALITY BY REVERSE FRAME PREDICTION".

The SCT color model has generated interest in the prior art for use with robot vehicle tracking and medical image analysis. See, e.g., Hyams, J. et al., "Position Estimation and Cooperative Navigation of Micro-Rovers Using Color Segmentation," AUTONOMOUS ROBOTS, special issue on CIRA '99, 9:1, 7–16 (2000), and Umbaugh, S. E., COMPUTER VISION AND IMAGE PROCESSING (1998). This transform has garnered interest due to insensitivity to variations in illumination; however, it has interesting properties with respect to human visual perception—a factor supporting the use of the SCT in accordance with embodiments of the present invention. The SCT is computed from the following formulae:

$$L = \sqrt{R^2 + G^2 + B^2}$$

$$\angle A = \cos^{-1}\left[\frac{B}{L}\right]$$

$$\angle B = \cos^{-1}\left[\frac{A}{L\sin(\angle A)}\right]$$

The above is determined from the plotting of a point in RGB space. The norm of the vector from the origin (white) to the point is L. The angle between L and the blue axis is $\angle A$ and the angle from the red axis to the projection of L onto the RG (Red-Green) plane is $\angle B$. The significance of this from a human visual perception standpoint is that the cones of the eye are more sensitive to blue than red or green, hence blue is used as the base reference. Also, there is a relationship between $\angle A$ and the white point, in that colors that are close to the white point are more distinguishable than colors further away.

After computation of the SCT, processing continues, in accordance with embodiments of the present invention, using Gabor wavelets. This filter was chosen for its biological relevance and technical properties. The Gabor wavelets are of similar shape to the receptive fields of simple cells in the primary visual cortex of the human brain. They are localized in both space and frequency domains and have the shape of plane waves restricted by a Gaussian envelope function. In 1981 Hubel and Wiesel were awarded the Nobel Prize in medicine for demonstrating the mechanism of object representation in the visual cortex. Essentially, they showed that V1 neurons (neurons of the primary visual cortex) produced a biologic analog to an edge detector. Later, Jones and Palmer (see Jones, J., et al., "An Evaluation of the Two-Dimensional Gabor Filter Model of Simple Receptive Fields in Cat Striate Cortex," J. Neurophysiol., 58:6, pp. 1233–1258 (1987)) showed that two-dimensional Gabor filters could model the behavior of the cells.

These filters have shapes corresponding to that shown in FIGS. 1A–1D (a Gaussian envelope restricting a plane wave). Daugman (see J. D. Daugman, "Complete Discrete 2-d Gabor Transforms by Neural Networks for Image Analysis and Compression," 36 IEEE Trans. Acoustics, Speech, and Signal Processing 1169–1179 (1988)) formulated the following biologically motivated filter based on the V1 studies:

$$p_k(x) = \frac{k^2}{\sigma^2}\exp\left(-\frac{k^2}{2\sigma^2}x^2\right)\left(\exp(ikx) - \exp\left(-\frac{\sigma^2}{2}\right)\right)$$

$$\|p_k(x)\|^2 \approx k^2$$

where the first exponential is the Gaussian envelope function restricting the plane wave, the factor exp(ikx) is the complex valued plane wave, the last exponential makes the filter direct current (DC) free and $k^2/\sigma^2$ compensates for the frequency-dependent decrease of the power spectrum in natural images. This filter can be formulated as a set of filters, or wavelets, that vary in scale and orientation from a base filter, or mother wavelet. In embodiments of the present invention, images are processed using four scales and eight orientations, which is consistent with standard practice. The number of orientations and scales is tunable with algorithm optimization.

After processing the images with the Gabor filter, a large number of pixels are generally found to be at or near zero, depending on the filter scale and orientation. For this reason, the number of non-zero pixels is usable as the feature that is related to the perceptual difference, and that value is scalable from zero to one since the total number of pixels is fixed.

As shown in FIG. 2A, an embodiment of the present invention incorporates a number of conversions and transformations of image information, as follows. An initial frame sequence 1, such as an image or images in YCrCb format are first converted using RGB conversion 2, applying methods known in the art, to an RGB frame sequence 3, which essentially recombines the color of the frame. The resulting RGB frame sequence 3 is then converted using SCT conversion 4, applying methods known in the art, to SCT images 5. In another embodiment of the present invention, the RGB conversion 2 and the SCT conversion 4 are combined into a single function, applying a method or combination of methods known in the art, such that the YCrCb frame sequence 1 is converted directly to SCT images 5. A Gabor filter 6 is applied to the SCT images to produce a Gabor Feature Set 7, and a statistics calculation 8 is applied to the Gabor Feature Set to produce Gabor Feature Set statistics 9, for example, for the reference frame.

Figure 2B:
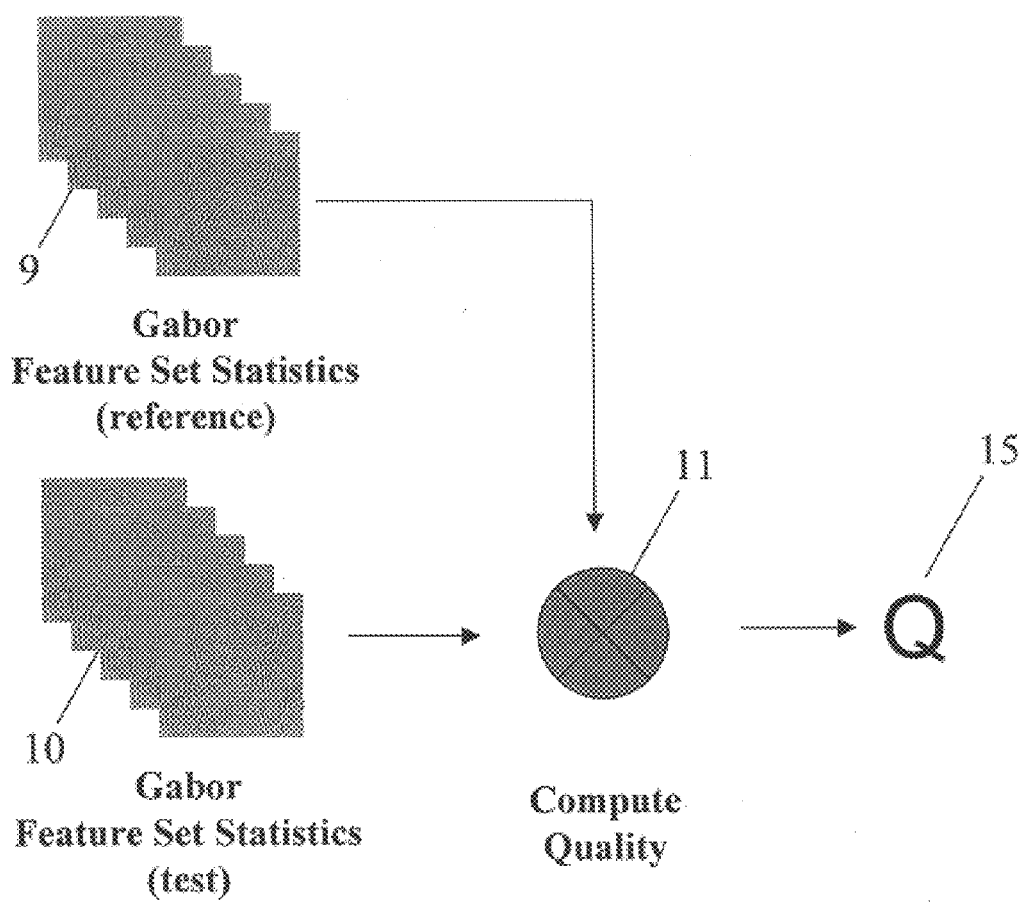

As shown in FIG. 2B, the Gabor Feature Set statistics for the reference frame 9 are compared to Gabor Feature Set statistics for a frame to be compared to the reference frame 10, which are also produced using the portions of the method shown in FIG. 2A. Quality is computed 11 for these Gabor Feature Set statistics 9, 10, producing a video quality measure 15.

The results of example applications of the present invention to various sample frames will now be described in more detail.

In a first example, comparison of the method of the present invention to subjective and other measures of video quality was made, in which digital video sequences were analyzed for files of contiguous YCrCb frames of 720×486 pixels. Four sequences of frames 13, 14, 15, 16, which are listed in the table shown in FIG. 3, were presented to subjective viewer panels, in which each sequence had undergone potential degradation, producing a total of 15 samples for each sequence 13, 14, 15, 16. The frames 13, 14, 15, 16 were also processed and analyzed using methods in accordance with the present invention. The results are shown in FIGS. 4A and 4B.

In FIG. 4A, the data is arrayed in paired columns, with the first column of each pair showing the ranking of the subjective testing and the second column the ranking produced by the process of the present invention. In the table results, each of the potentially degraded clips was ranked, both subjectively by humans and using a produced video quality measure, in accordance with an embodiment of the present invention. For example, the first column, labeled "S-SRC 13" presents the human subjective quality rankings for each of the 15 degradations of the video clip. The third degradation applied to clip 13 (i.e., the first number in the column) was subjectively found to be the best clip after degradation, and the $15^{th}$ degradation applied to clip 13 was found to be the worst clip after degradation (i.e., the last number in the column).

In comparison, the second column presents the rankings for the same 16 degradations applied to clip 13 using the method of the present invention. Using the present invention, the fourth degradation, for example, was found to be the best clip after degradation, and the $15^{th}$ degradation applied to clip 13 was found to be the worst clip after degradation.

At the bottom, the row marked "correlation" indicates the Spearman ranked correlation coefficient, as is known in the art, between each of the pairs of columns (the subjective measure ranking versus the ranking produced by the present invention) compared with results that the PSNR proponent produced for SRCs 13 and 15 (SRCs 14 and 16 were not computed). A high Spearman ranked correlation coefficient indicates high correlation between the two columns. The row marked "PSNR" indicates the Spearman ranked correlation coefficient produced by ranking the clips using PSNR. As indicated, the Spearman ranked correlation coefficient show that results for the present invention produced better correlation to subjective human judgments than PSNR for clips 13 and 15.

FIG. 4B shows the complete proponents data for SRCs 13 and 15 for comparison. The correlations for each proponent against the subjective rankings are also listed. Note that the method of the present invention performed significantly better than PSNR (column p0) and all proponents on SRC 13 (compare FIGS. 4A and 4B), as well as better than PSNR and acceptable on SRC 15. These results indicate that the method of the present invention is useful in conjunction with the method of applicant's U.S. patent application Ser. No. 09/911,575, filed Jul. 25, 2001, and titled "METHOD FOR MONITORING AND AUTOMATICALLY CORRECTING DIGITAL VIDEO QUALITY BY REVERSE FRAME PREDICTION".

Example results for spectral output produced using sample images, in accordance with embodiments of the present invention, will now be described.

Figure 5A:
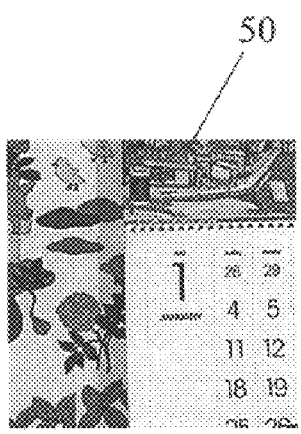
FIGS. 5A–5C shows three example frames compared using a method in accordance with embodiments of the present invention.
Figure 5B:
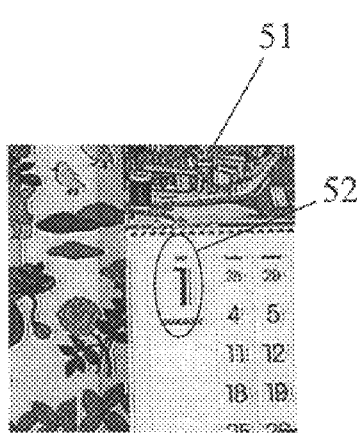
Figure 5C:

FIGS. 5A, 5B, and 5C present three example frames 50, 51, and 53, respectively, that were compared using the method of the present invention to produce spectral output. Frame 50, referred to as the SRC-15 frame, is a source frame in this example. Frame 51, referred to as the HRC-1 frame, has undergone a first degradation. Ellipsed area 52 indicates one area of degradation in frame 51, such as via degradation referred to as "ringing" for the portion of the image containing the number "1" in the frame 51 and blurring of the portion of the image containing the word "January" in the frame 51. Frame 53 presents a second degradation of the source frame 50.

With regard to the spectral decomposition of the frames, in an embodiment of the present invention, rather than perform the statistics calculation to produce the Gabor feature set statistics for both the reference frame and the frame to be compared, the Gabor feature set results are graphically compared for the two frames. The graphical representation for each frame is referred to as the "Gabor spectrum." Essentially, the graphical representation presents the strengths of the various Gabor coefficients.

In an embodiment of the present invention, the graphical results are correlatable to the compared images, and specific quality degradations or other frame differences are potentially correlatable to specific coefficients and strengths in the graphical representation. For example, a specific quality degradation, such as blocking, occurring for a frame, may be identifiable via strength differences for identified coefficients in the Gabor spectrum.

Figure 6:
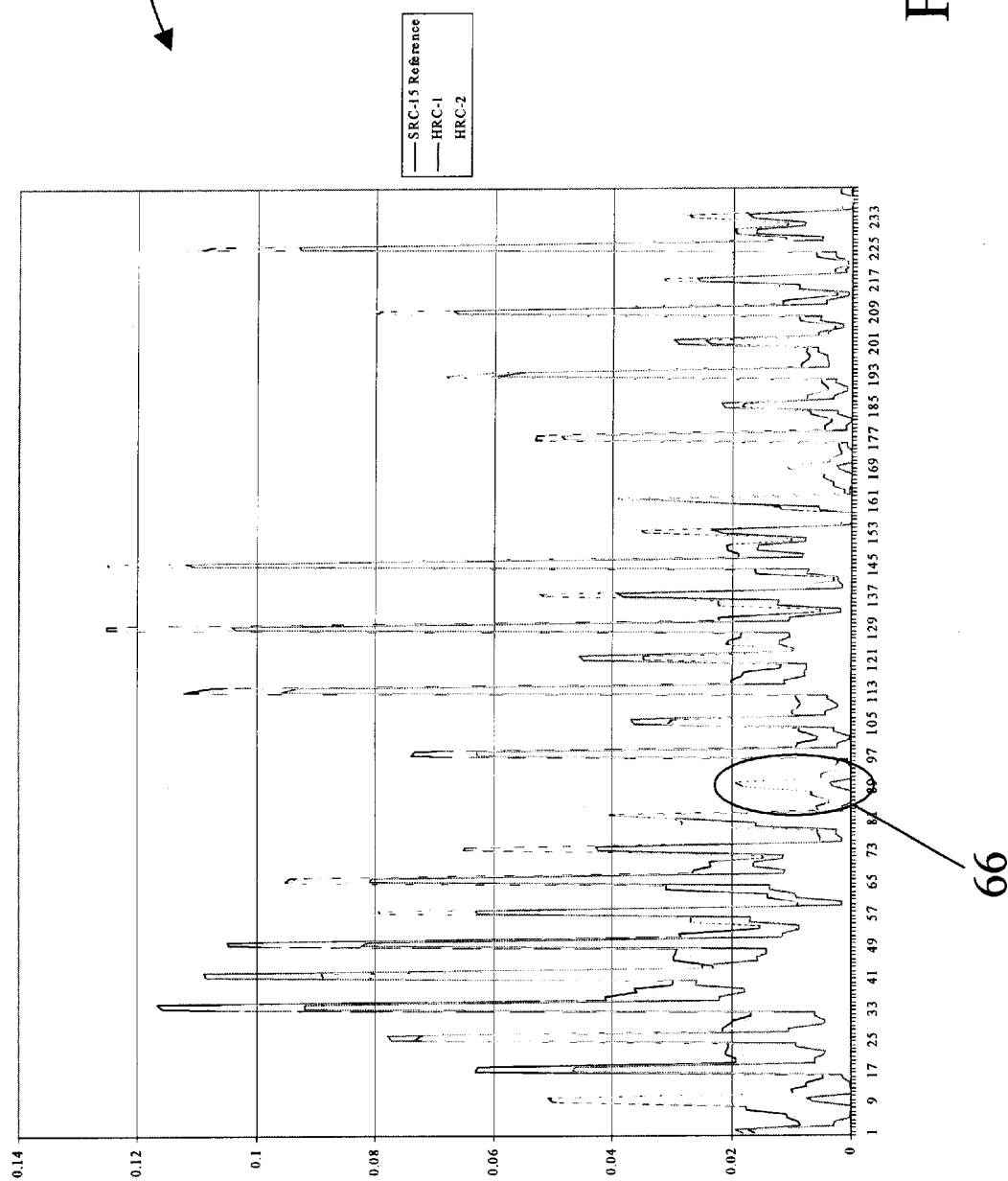
FIG. 6 presents the spectral data for the example frames of FIGS. 5A–5C, produced using a method in accordance with embodiments of the present invention.

Specifically, to produce the spectral output, in the processing, the real and imaginary Gabor filtered frames are obtained and the non-zero pixels are counted. This is the perceptual equivalent of a "hit" for that pixel at the specific scale and rotation for that frame. In the analysis, two hundred and forty values are generated, for example, which are then used to determine the Gabor feature set statistics as an averaged and normalized sum. If these values are plotted, a chart such as that shown in FIG. 6 is derived. The x-axis of the chart is the Gabor feature number. These are determined from the real and imaginary filter outputs over five scales and eight rotations for the L, $\angle A$ and $\angle B$ SCT transformed images. The vertical axis is feature strength, where all values are scaled to unity. The total number of pixels available for any given frame is 65,536 (256×256) and the strength represents the fraction of those pixels that are nonzero. The chart is the spectra of the SRC-15 reference image against the spectra of the same data after HRC-1 (Betacam) and HRC-2 (422p@ml).

Review of the resulting spectra for example analyses, such as that shown in FIG. 6, reveals some interesting features of the concept, including the following. In FIG. 6, for the band at Gabor features 85 through 95 with the center at 90 (marked with vertical ellipse 66), there is decreased activity in HRC-1 where the reference and HRC-2 have almost identical values. There are other values in the spectra where this phenomena is observed. HRC-1 is a multi-generation Betacam produced image, considered one of the set of high quality HRCs, although the 422p@ml (HRC-2) is arguably of higher quality. SRC-15 is the fairly well-known "calendar" sequence with multiple bright colors and movement. FIGS. 5A–5C show representative frames from each sequence. From these it is clear that there are vertical ringing artifacts in the HRC-1 picture (marked with a vertical ellipse) that are not present in the SRC or HRC-2 images.

The fact that obvious differences exist in both the spectra and the images leads to the conclusion that the GDA spectrum presents a viable tool for quality analysis. Based on the results obtained for various examples, such as the one shown in FIG. 6, the GDA spectrum is potentially usable as a dynamic analysis tool for evaluating digital sequences in real-time. This type of analysis aids in the coding of compression schemes and also in the evaluation of digital video channels by allowing the developer to fine tune the algorithm under test to maximize quality or to detect where the source is being degraded.

The computed quality measure produced for the two frames, represented by the process shown in FIGS. 2A and 2B, reflects a summation of the differences for each of the data for all of the points (e.g., the 240 points of FIG. 6), which is then normalized (e.g., for the graphical output of FIG. 6, the normalization factor is 240). The value for normalization generally depends on the number of rotations, the number of scales, and the size of the images compared.

Normalization is used to address the differences in frame size being compared. For example, standard VGA monitor images contain 640 by 480 pixels of information, whereas HDTV monitors have 1180×720 pixels of information. Each image is normalized based on the size of the image (total number of pixels). This allows comparable image quality determinations to be made, regardless of the size of the images being compared.

An example application of the present invention will now be further described in detail. This example application is intended to be merely representative of the present invention, and the present invention is therefore not intended to be limited to the example presented.

Figure 7:
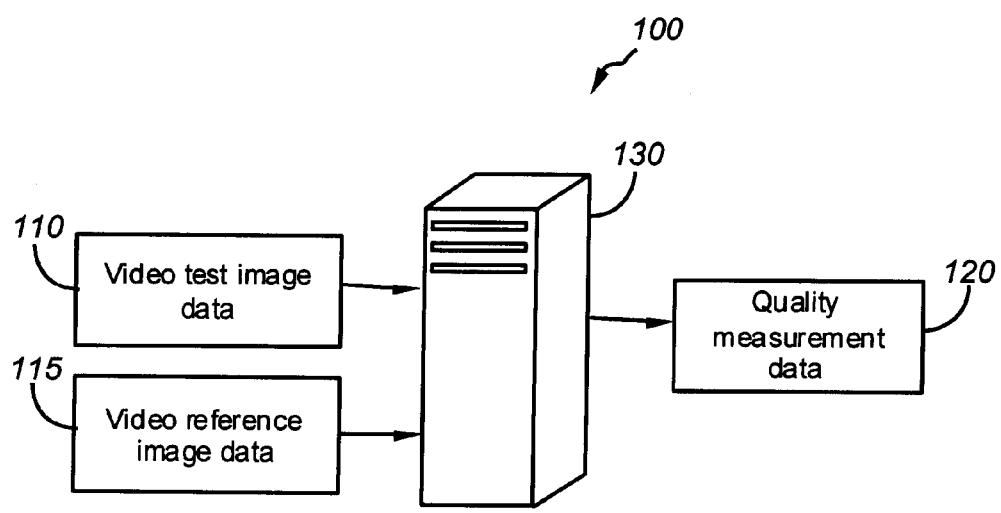
FIG. 7 presents an example of an apparatus for measuring and analyzing digital video quality in accordance with an embodiment of the present invention.

FIG. 7 shows an example of an apparatus for measuring and analyzing digital video quality in accordance with an embodiment of the present invention.

Figure 8:
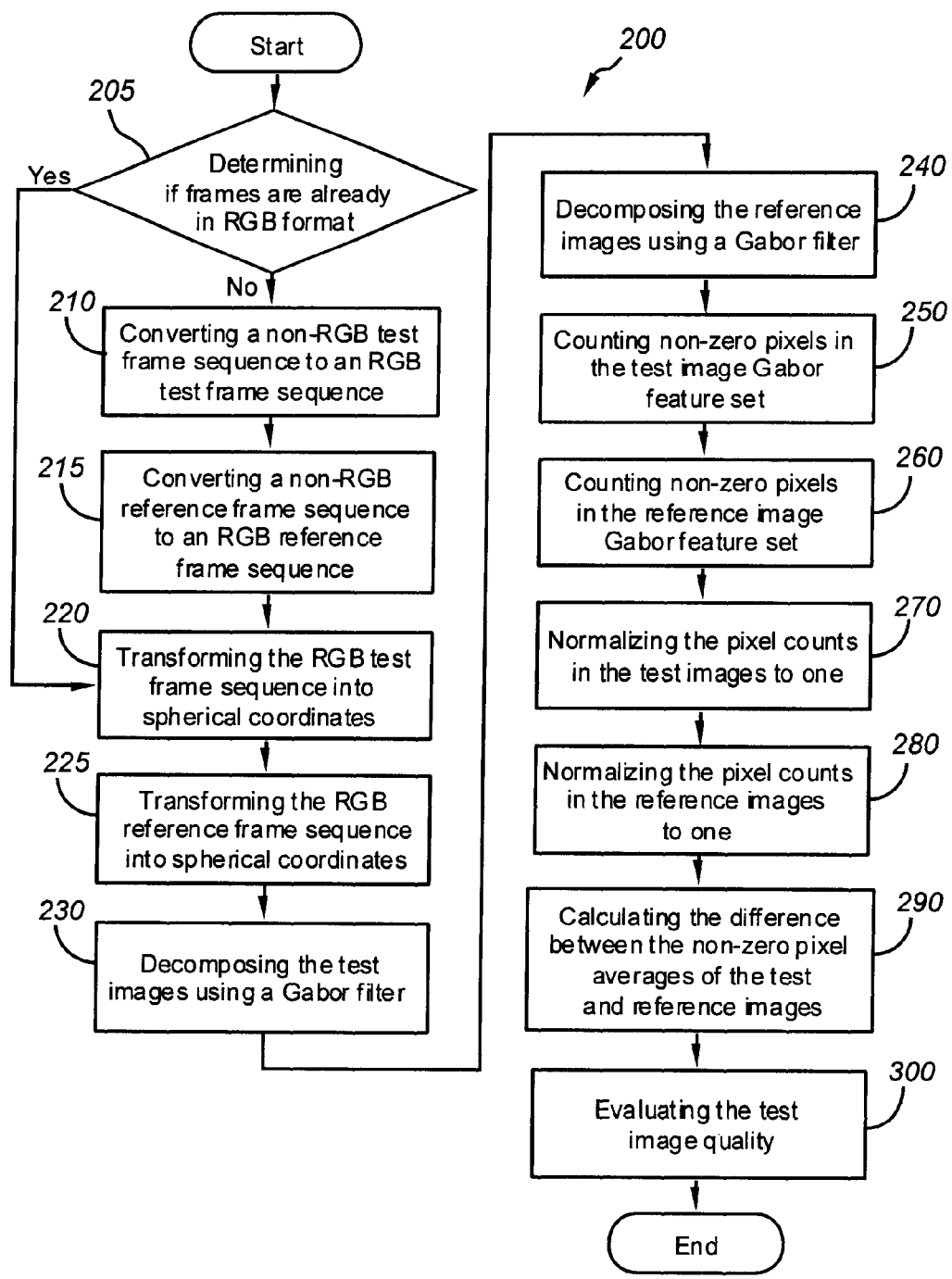
FIG. 8 is a flowchart of a method for analyzing and measuring digital video quality in accordance with an embodiment of the present invention.

FIG. 8 shows a flowchart of a method for analyzing and measuring digital video quality. As shown in FIG. 8, software and hardware of a video-processing system 130 has acquired and stored sequences of video test image data 110 and video reference image data 115. The method includes a series of actions, as follows:

1. Determining if frames are already in Red-Green-Blue (RGB) format 205. Programmatic logic determines whether video test image data 110 and video reference image data 115 are already in RGB format, or are in another format, such as YCrCb. If video test image data 110 and video reference image data 115 are already in RGB format, the process 200 proceeds with transforming the RGB test frame sequence into spherical coordinates 225; otherwise the process proceeds with the next action 210.

2. Converting a non-RGB test frame sequence to an RGB test frame sequence 210. Programmatic logic converts a series of frames from video test image data 110 to the RGB coding scheme using, for example, well-known algorithms. One example is YCrCb-to-RGB conversion. In the YCrCb scheme, Y contains the pixel's intensity information, and U and V are two color differences providing color information. In the present example, in accordance with an embodiment of the present invention, conversions and calculations are performed on the video-processing system 130 of FIG. 7.

3. Converting a non-RGB reference frame sequence to an RGB reference frame sequence 215. Programmatic logic converts a series of video frames from video reference image data 115, encoded in any digital video format, to the RGB color coding scheme, as described in the previous action 210.

4. Transforming the RGB test frame sequence into spherical coordinates 220. Programmatic logic transforms the image pixels in the frames of video test image data 110 into spherical coordinates in RGB space, using standard trigonometric transformation algorithms. The components of the spherical coordinate system include the combined vector length of the red, green, and blue intensities, the angle between this vector and the blue axis, and the angle between the projection of this vector on the red-green plane and the red axis. Blue is the base reference in this coordinate system.

5. Transforming the RGB reference frame sequence into spherical coordinates 225. In this action, programmatic logic transforms the image pixels in the video reference image data 115 frames into spherical coordinates in RGB space, as described in the previous action 220.

6. Decomposing the test images using a Gabor filter 230. Programmatic logic decomposes the video test image data 110 frames into a Gabor feature set, using a standard, two-dimensional Gabor filter. These filters have the characteristic shape of Gaussian wavelets. The embodiment of the present invention used for this example utilizes a set of filters, or wavelets, that vary in scale and orientation from a base filter, or wavelet. In one example, the components of a single image are separated into multiple images (the feature set), each of these multiple images being a component of the original image that has one of eight scales and one of four orientations. Programmatic logic ignores those components not having one of the selected scales and orientations.

7. Decomposing the reference images using a Gabor filter 240. Programmatic logic decomposes the video reference image data 115 frames into a Gabor feature set, as described in the previous action 230.

8. Counting non-zero pixels in the test image Gabor feature set 250. Programmatic logic selects one frame at a time from the video test image data 110 sequence. In each of the component images created from this frame by the Gabor filter of step 230, a large number of pixels have values at or near zero, depending on the filter scale and orientation. Any object in the frames of the video test image data 110 with one of the eight scale or one of the four orientation properties selected for the Gabor filter has non-zero pixels. The programmatic logic counts all these non-zero pixels in the component images of each test frame.

9. Counting non-zero pixels in the reference image Gabor feature set 260. In this action, programmatic logic selects one frame at a time from the sequence of the video reference image data 115. The programmatic logic counts the non-zero pixels in the component images (created when decomposing the reference images using a Gabor filter 240) of each frame of video reference image data 115, as detailed in the previous action 250.

10. Normalizing the pixel counts in the test images to one 270. Since the total number of pixels in every image is constant, programmatic logic divides the number of non-zero pixels counted in the action for counting non-zero pixels in the test image Gabor feature set 250 by the total number of pixels in the image, thus scaling the pixel count between zero and one.

11. Normalizing the pixel counts in the reference images to one 280. Since the total number of pixels in every image is constant, programmatic logic divides the number of non-zero pixels counted in the reference image Gabor feature set 260 by the total number of pixels in the image, thus scaling the pixel count between zero and one.

12. Calculating the difference between the non-zero pixel averages of the test and reference images 290. In this action, programmatic logic calculates the difference between the non-zero pixel average for the processed video reference image data 115 and the non-zero pixel average for the video test image data 110. Since each of the frames of video test image data 110 and the frames for the video reference image data 115 have the same total number of pixels, in one embodiment, the result produced by normalizing pixel counts in the reference image to one 280 is subtracted from the result obtained by normalizing the pixel counts in the test image to one 270 and the absolute value of the difference is used.

13. Evaluating the test image quality 300. A straightforward software routine evaluates video quality. The normalized difference calculated in the previous action 290 is proportional to the quality of video test image data 110. This is quality measurement data 120. The smaller this value, the higher the image quality with respect to video reference image data 115. A value equal to zero represents no qualitative difference between video test image data 110 and video reference image data 115, and thus no visually perceptible degradation. As the quality of video test image data 110 worsens with respect to video reference image data 115, the number of differences revealed by the process 200 increases, and the value of quality measurement data 120 increases toward one. This approach mimics subjective testing in which a person visually compares a reference clip (video sequence) to a potentially degraded test clip.

Example embodiments of the present invention have now been described in accordance with the above advantages. It will be appreciated that these examples are merely illustrative of the invention. Many variations and modifications will be apparent to those skilled in the art.

What is claimed is:

1. A method for comparing image quality for a first image and a second image, the method comprising:

identifying a first set of Red-Green-Blue (RGB) image data for the first image and a second set of RGB image data for the second image;

transforming the first RGB image data to spherical coordinates, wherein the spherical coordinates for the first RGB image data comprise a first set of Spherical Coordinate Transform (SCT) image data;

transforming the second RGB image data to spherical coordinates, wherein the spherical coordinates for the first RGB image data comprises a second set of SCT image data;

applying a Gabor filter to the first set of SCT image data to produce a first Gabor feature set;

applying the Gabor filter to the second set of SCT image data to produce a second Gabor feature set;

applying a statistics calculation to the first Gabor feature set to produce a first set of Gabor feature statistics;

applying the statistics calculation to the second Gabor feature set to produce a second set of Gabor feature statistics; and comparing the first set of Gabor feature statistics to the second set of Gabor feature statistics.

2. The method of claim 1, wherein identifying a first RGB image for the first image and a second RGB image for the second image further comprises:

converting a first luma-red chroma-blue chroma (YCrCb) image for the first image to the first RGB image; and converting a second YCrCb image for the second image to the second RGB image.

3. The method of claim 1, wherein comparing the first set of Gabor feature statistics to the second set of Gabor feature statistics comprises:

computing a quality measure for the first set of Gabor feature statistics compared to the second set of Gabor feature statistics.

4. The method of claim 3, wherein the first set of Gabor feature statistics includes a first plurality of Gabor feature numbers and a first plurality of values, each of the first plurality of values corresponding to one from the first plurality of Gabor feature numbers;

wherein the second set of Gabor feature statistics includes a second plurality of Gabor feature numbers and a second plurality of values, each of the second plurality of values corresponding to one from the second plurality of Gabor feature numbers;

wherein each of the first plurality of Gabor feature numbers has a corresponding one of the second plurality of Gabor feature numbers; and wherein computing a quality measure for the first set of Gabor feature statistics compared to the second set of Gabor feature statistics includes:

for each of the values for each of the first plurality of Gabor feature numbers determining a difference with the corresponding value for each of the second plurality of Gabor feature numbers, such that a plurality of differences are produced; and summing the plurality of produced differences.

5. The method of claim 3, wherein the first set of Gabor feature statistics includes a first plurality of Gabor feature numbers and a corresponding first plurality of values for the first plurality of Gabor feature numbers;

wherein the second set of Gabor feature statistics includes a second plurality of Gabor feature numbers and a corresponding second plurality of values for the second plurality of Gabor feature numbers;

wherein each of the first plurality of Gabor feature numbers has a corresponding one of the second plurality of Gabor feature numbers; and wherein computing a quality measure for the first set of Gabor feature statistics compared to the second set of Gabor feature statistics includes:

summing the corresponding values for each of the first plurality of Gabor feature numbers to produce a first sum;

summing the corresponding values for each of the second plurality of Gabor feature numbers to produce a second sum; and determining the difference between the first sum and the second sum.

6. The method of claim 4, further comprising:

normalizing the summed plurality of produced differences.

7. The method of claim 6, wherein the first plurality of Gabor feature numbers comprise a first discrete number of first Gabor feature numbers; and wherein normalizing the summed plurality of produced differences comprises:

dividing the summed plurality of produced differences by the first discrete number of first Gabor feature numbers.

8. The method of claim 7, wherein the second plurality of Gabor feature numbers comprise a second discrete number of second Gabor feature numbers; and wherein the first discrete number of first Gabor feature numbers is equal to the second discrete number of second Gabor feature numbers.

9. The method of claim 1, wherein identifying a first RGB image for the first image comprises:

determining if the first image comprises an RGB image.

10. The method of claim 9, wherein identifying a first set of RGB image data for the first image and a second set of RGB image data for the second image comprises:

determining if the first image comprises RGB image data; and determining if the second image comprises RGB image data.

11. A method for analyzing quality of an image, comprising:

identifying Red-Green-Blue (RGB) image data for the image;

transforming the RGB image data to spherical coordinates, such that the image includes Spherical Coordinate Transform (SCT) image data;

applying a Gabor filter to the SCT image data to produce a Gabor feature set for the image; and applying a statistics calculation to the Gabor feature set for the image to produce Gabor feature statistics for the image.

12. A system for comparing image quality for a first image and a second image, the system comprising:
- a processor for receiving and processing the first image and the second image; and
- a repository for storing information from the received first image and the received second image;
- wherein the processor identifies a first set of Red-Green-Blue (RGB) image data for the first image and a second set of RGB image data for the second image;
- wherein the processor transforms the first RGB image data to spherical coordinates, wherein the spherical coordinates for the first RGB image data comprise a first set of Spherical Coordinate Transform (SCT) image data;
- wherein the processor transforms the second RGB image data to spherical coordinates, wherein the spherical coordinates for the second RGB image data comprise a second set of SCT image data;
- wherein the processor applies a Gabor filter to the first set of SCT image data to produce a first Gabor feature set;
- wherein the processor applies a Gabor filter to the second set of SCT image data to produce a second Gabor feature set;
- wherein the processor applies a statistics calculation to the first Gabor feature set to produce a first set of Gabor feature statistics;
- wherein the processor applies the statistics calculation to the second Gabor feature set to produce a second set of Gabor feature statistics; and
- wherein the processor compares the first set of Gabor feature statistics to the second set of Gabor feature statistics.

13. The system of claim 12, wherein the repository comprises a database.

14. The system of claim 12, wherein the processor comprises a terminal.

15. The system of claim 14, wherein the terminal comprises one selected from a group consisting of a personal computer, a minicomputer, a microcomputer, and a main frame computer.

16. A system for comparing image quality for a first image and a second image, the system comprising:
- means for identifying a first set of Red-Green-Blue (RGB) image data for the first image and a second set of RGB image data for the second image;
- means for transforming the first RGB image data to spherical coordinates, wherein the spherical coordinates for the first RGB image data comprise a first set of Spherical Coordinate Transform (SCT) image data;
- means for transforming the second RGB image data to spherical coordinates, wherein the spherical coordinates for the first RGB image data comprises a second set of SCT image data;
- means for applying a Gabor filter to the first set of SCT image data to produce a first Gabor feature set;
- means for applying the Gabor filter to the second set of SCT image data to produce a second Gabor feature set;
- means for applying a statistics calculation to the first Gabor feature set to produce a first set of Gabor feature statistics;
- means for applying the statistics calculation to the second Gabor feature set to produce a second set of Gabor feature statistics; and
- means for comparing the first set of Gabor feature statistics to the second set of Gabor feature statistics.

* * * * *